(12) United States Patent
Kitaoka et al.

(10) Patent No.: US 6,650,484 B2
(45) Date of Patent: Nov. 18, 2003

(54) ZOOM LENS, AND ITS MANUFACTURING METHOD

(75) Inventors: Yasuhisa Kitaoka, Tokushima (JP); Akihiro Muramatsu, Kagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/069,315

(22) PCT Filed: Jun. 20, 2001

(86) PCT No.: PCT/JP01/05294
§ 371 (c)(1),
(2), (4) Date: Jun. 14, 2002

(87) PCT Pub. No.: WO01/98812
PCT Pub. Date: Dec. 27, 2001

(65) Prior Publication Data
US 2002/0191304 A1 Dec. 19, 2002

(30) Foreign Application Priority Data
Jun. 21, 2000 (JP) .......................... 2000-186607

(51) Int. Cl.[7] .............................. G02B 15/14
(52) U.S. Cl. ....................... 359/687; 359/686
(58) Field of Search ................. 359/676, 686, 359/687

(56) References Cited
U.S. PATENT DOCUMENTS
3,920,315 A * 11/1975 Linke .................... 359/686
5,546,231 A * 8/1996 Sato .................... 359/687

FOREIGN PATENT DOCUMENTS

| JP | 2-55308 | 2/1990 |
|----|---------|--------|
| JP | 3-200113 | 9/1991 |
| JP | 4-104114 | 4/1992 |
| JP | 8-94931 | 4/1996 |
| JP | 8-106046 | 4/1996 |
| JP | 8-320434 | 12/1996 |
| JP | 9-311272 | 12/1997 |
| JP | 11-194273 | 7/1999 |
| JP | 11-305129 | 11/1999 |
| JP | 2001-033695 | 2/2001 |

* cited by examiner

Primary Examiner—Georgia Epps
Assistant Examiner—Darryl J. Collins
(74) Attorney, Agent, or Firm—Merchant & Gould, P.C.

(57) ABSTRACT

A zoom lens includes a first lens group (1) having a positive refracting force that is fixed, a second lens group (2) having a negative refracting force that is movable along an optical axis and provided with a function of varying magnification, a third lens group (3) having a positive refracting force that is fixed, and a fourth lens group (4) having a positive refracting force that is movable along an optical axis and provided with a function of correcting fluctuations of an image plane resulting from varying magnification or changing an object distance (4), the first, second, third and fourth lens groups being disposed from an object side in this order, wherein the third lens group (3) and the fourth lens group (4) both include a positive glass spherical lens (L5, L8) and a plastic aspherical lens (L6, L7) having weaker refracting power. Thus, a compact zoom lens having a high magnification ratio of 20 times can be obtained at low cost.

6 Claims, 8 Drawing Sheets

ZOOM LENS, AND ITS MANUFACTURING METHOD

TECHNICAL FIELD

The present invention relates to a zoom lens having a high magnification, a compact size, low cost and high performance used suitably for a video camera, and to a method for manufacturing the same.

BACKGROUND ART

Conventionally, as a zoom lens used for a video camera, a zoom lens composed of four groups of lenses is known, as can be seen in JP2(1990)-55308A. The four groups include: a first lens group having a positive refracting force that is fixed; a second lens group having a negative refracting force that is movable for varying magnification; a third lens group having a positive refracting force that is fixed; and a fourth lens group having a positive refracting force that is movable for correcting fluctuations of an image plane resulting from varying magnification and also for focusing. The first, second, third and fourth lens groups are disposed from an object side in this order.

In addition, JP4(1992)-104114A (hereinafter referred to as a conventional example 1) discloses a zoom lens composed of four groups of lenses as described above in which one glass aspherical lens is used for the third lens group and the fourth lens group respectively mainly for the purpose of miniaturization. However, since a glass aspherical lens needs to be formed by a molding method at a high temperature, an expensive metal mold has a short lifetime, and the cost for a glass aspherical lens is about three times as high as for a glass spherical lens.

Furthermore, JP9(1997)-311272A (hereinafter referred to as a conventional example 2) uses a plastic lens for cost reduction. However, a plastic lens has a large coefficient of linear expansion and is also susceptible to a temperature change, so that its performance with respect to an image pickup device with a large number of pixels is not sufficient. Moreover, due to its low refractive index, a plastic lens is not suitable for miniaturization.

Furthermore, JP11(1999)-194273A (hereinafter referred to as a conventional example 3) proposes a method for manufacturing a zoom lens at low cost by replacing the glass aspherical lens in the third lens group of the conventional example 1 with a plastic aspherical lens. However, the problem was that this zoom lens is susceptible to deformation caused by a temperature change as in the conventional example 2.

As described above, a glass aspherical lens used for miniaturizing a zoom lens for a video camera was disadvantageously expensive. Moreover, when the expensive glass aspherical lens was replaced with an inexpensive plastic lens, due to the fact that plastics have a coefficient of linear expansion of about ten times as large as that of glass, the problem was that the effects of fluctuations in the refractive index or deformation caused by temperature changes were serious.

DISCLOSURE OF THE INVENTION

It is an object of the present invention to provide a zoom lens having a compact size while maintaining a high magnification ratio of about 20 times and a brightness of about F1.6, which at the same time is less susceptible to a temperature change, capable of realizing high performance at low cost and highly competitive from a practical standpoint.

To achieve the above-mentioned object, the present invention has the following structure.

A zoom lens of the present invention includes a first lens group having a positive refracting force that is fixed; a second lens group having a negative refracting force that is movable along an optical axis and provided with a function of varying magnification; a third lens group having a positive refracting force that is fixed; and a fourth lens group having a positive refracting force that is movable along an optical axis and provided with a function of correcting fluctuations of an image plane resulting from varying magnification or changing an object distance, the first, second, third and fourth lens groups being disposed from an object side in this order, wherein the third lens group and the fourth lens group both include a positive glass spherical lens and a plastic aspherical lens.

According to this configuration, when the refracting power of each lens group is enhanced for miniaturization, the refracting power needed therefor can be provided to the side of the glass spherical lens. Moreover, the plastic lenses provide aspherical surfaces needed for correcting aberration that increases particularly in the latter groups (the third group, the fourth group). Thus, by combining the glass spherical lens with the plastic aspherical lens, the effects of fluctuations in the refractive index or deformation caused by temperature changes which were regarded as disadvantageous in the conventional plastic lenses can be reduced, and by taking advantage of the properties of an inexpensive plastic lens, a compact zoom lens of high performance with a high magnification ratio of 20 times can be realized at low cost.

In the above-mentioned zoom lens, it is preferable that the plastic aspherical lens in the third lens group and the plastic aspherical lens in the fourth lens group satisfy the following conditional expressions:

$$fw/|f3p|<0.02$$

$$fw/|f4p|<0.02$$

where fw is a focal length of an entire system at a wide-angle end, f3p is a focal length of the plastic aspherical lens in the third group, and f4p is a focal length of the plastic aspherical lens in the fourth group.

By weakening the refracting power of the plastic aspherical lens used for the third lens group as well as for the fourth lens group in such a manner, the effects of fluctuations in the refractive index or deformation caused by temperature changes can be reduced, so that a zoom lens that is less susceptible to the use environment and has a compact size and high performance can be realized at low cost.

Furthermore, it is preferable in the above-mentioned zoom lens that the third lens group includes 2 lenses in 2 groups composed of a positive glass spherical lens and a plastic aspherical lens disposed from an object side in this order. By disposing a plastic aspherical lens in a position where axial marginal rays are almost afocal in the third group in such a manner, the effects of fluctuations in the refractive index or deformation caused by temperature changes can be reduced greatly, so that a zoom lens that has a compact size and high performance can be provided at low cost.

Next, a method for manufacturing a zoom lens of the present invention is characterized by including a third lens group and a fourth lens group respectively having a positive glass spherical lens and a plastic aspherical lens while using at least one or more lenses or lens barrels of an arbitrary zoom lens that is constructed of a first lens group having a positive refracting force that is fixed, a second lens group having a negative refracting force that is movable along an optical axis and provided with a function of varying magnification, a third lens group having a positive refracting force that is fixed, and a fourth lens group having a positive refracting force that is movable along an optical axis and provided with a function of correcting fluctuations of an image plane resulting from varying magnification or changing an object distance, the first, second, third and fourth lens groups being disposed from an object side in this order. Here, as the arbitrary zoom lens using lenses or lens barrels, for example, the zoom lenses shown in the above-mentioned conventional technologies can be used. As examples, there are a zoom lens in which the first lens group and the second lens group are composed entirely of glass spherical lenses, a zoom lens in which positive glass aspherical lenses are disposed for the third lens group and the fourth lens group, or a zoom lens in which plastic lenses with comparatively large refracting power are provided for the third lens group and the fourth lens group. In particular, the zoom lens preferably is a zoom lens in which positive glass aspherical lenses are provided for the third lens group and the fourth lens group. In addition, the first lens group and the second lens group preferably are composed entirely of glass spherical lenses.

According to the manufacturing method of the present invention, when both the zoom lens of the present invention mentioned above and a zoom lens other than this type (for example, a conventional zoom lens composed of four groups using positive glass aspherical lenses for the third group and the fourth group) are to be manufactured, components (lenses or lens barrels) other than the third lens group and the fourth lens group can be shared partially or entirely, so that a zoom lens having a compact size and high performance can be manufactured at low cost using fewer metal molds or with less capital investment. For example, since it becomes possible to provide a zoom lens that is suited for a high number of pixels in an image pickup device at low cost, it is particularly effective for conforming to merchandise lines of a video camera.

In the above-mentioned manufacturing method, it is preferable that the plastic aspherical lens in the third lens group and the plastic aspherical lens in the fourth lens group satisfy the following conditional expressions:

$fw/|f3p|<0.02$ $fw/|f4p|<0.02$ where fw is a focal length of an entire system at a wide-angle end, f3p is a focal length of the plastic aspherical lens in the third group, and f4p is a focal length of the plastic aspherical lens in the fourth group.

By weakening the refracting power of the plastic aspherical lens used for the third lens group as well as for the fourth lens group, the effects of fluctuations in the refractive index or deformation caused by temperature changes can be reduced, so that a zoom lens that is less susceptible to the use environment and has a compact size and high performance can be obtained at low cost.

BEST MODE FOR CARRYING OUT THE INVENTION

[Embodiment 1]

Hereinafter, Embodiment 1 of the present invention will be described with reference to FIG. 1 to FIG. 4.

Figure 1:
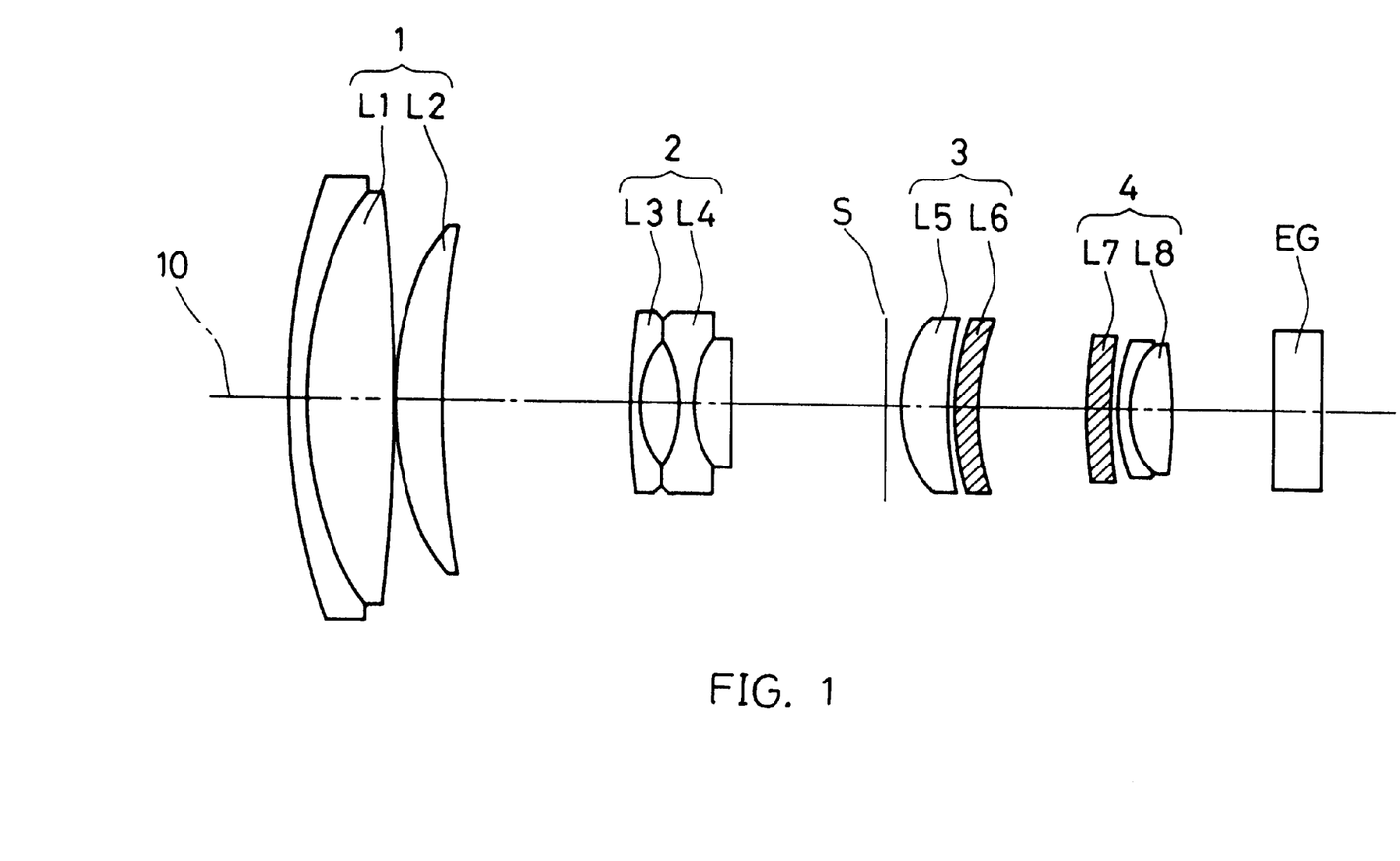
FIG. 1 is a view showing the configuration of a zoom lens in a first embodiment of the present invention.

FIG. 1 is a view showing the configuration of a zoom lens according to Embodiment 1 of the present invention. As shown in FIG. 1, a zoom lens in the present embodiment has a structure in which a first lens group 1, a second lens group 2, a diaphragm S, a third lens group 3, a fourth lens group 4 and an equivalent glass EG that is equivalent to a cover glass or a low-pass filter etc. of an image pickup device are disposed from an object side (left side in the drawing) in this order. The first lens group 1 includes a lens L1 composed of two lenses bonded together and a lens L2 and has a positive refracting power as a whole, which is fixed to a lens barrel not shown in the drawing. Both lenses L1 and L2 are glass spherical lenses having a positive refracting power. The second lens group 2 includes a lens L3 and a lens L4 composed of two lenses bonded together and has a negative refracting power as a whole, which is movable along an optical axis 10 and provided with a function of varying magnification (zooming). Both lenses L3 and L4 are glass spherical lenses. The diaphragm S is fixed to the lens barrel not shown in the drawing. The third lens group 3 is composed of lenses L5 and L6 and has a positive refracting power as a whole, which is fixed to the lens barrel not shown in the drawing. The lens L5 is a glass spherical lens having a positive refracting power, and the lens L6 is a plastic aspherical lens. The fourth lens group 4 includes a lens L7 and a lens L8 composed of two lenses bonded together and has a negative refracting power as a whole, which is movable along an optical axis 10 and provided with a function of correcting (focusing) fluctuations of an image plane resulting from varying magnification or changing an object distance. The lens L7 is a plastic aspherical lens, and the lens L8 is a glass spherical lens having a positive refracting power. In FIG. 1, plastic aspherical lenses are hatched.

The following Table 1 shows examples of values for the zoom lens in Embodiment 1. In Table 1, r1, r2, . . . respectively show a radius of curvature on each lens surface (where a surface with * is an aspherical surface, and in this case, r shows a radius of curvature of a reference spherical surface); d1, d2, . . . respectively show a thickness of each lens or an air distance; n1, n2, . . . respectively show a refractive index of each lens with respect to a d-line; and v1, v2, . . . respectively show an Abbe number with reference to the d-line. Each numerical subscript shows the corresponding number in counting from the object side in this order. Furthermore, f shows a focal length of an entire system, and F/shows an F number.

In the drawing, air distances d5, d10, d15 and d20 are variable and also show each focal length f at a wide-angle end, an intermediate position and a telephoto end and the above-mentioned variable air distances at the respective moments.

In addition, the shape of each aspherical surface for the plastic aspherical lens L6 (r14, r15) and that for the plastic aspherical lens L7 (r16, r17) are expressed by the following equation:

$$x = (h^2/r)/(1+(1-(K+1)h^2/r^2)^{1/2}) + Ah^4 + Bh^6 + Ch^8 + Dh^{10} + Eh^{12}$$

where x is an optical direction, h is a distance from an optical axis, and r is a radius of curvature of a reference spherical surface. Aspherical coefficients K, A, B, C, D and E of the respective surfaces are also shown in Table 1.

TABLE 1 f = 3.76 – 73.9    F/1.67 – F/3.26

| | | | | | | | |
|---|---|---|---|---|---|---|---|
| r1 | 46.666 | d1 | 1.000 | n1 | 1.84666 | v1 | 23.8 |
| r2 | 23.849 | d2 | 4.450 | n2 | 1.60311 | v2 | 60.6 |
| r3 | −131.8300 | d3 | 0.150 | | | | |
| r4 | 20.159 | d4 | 3.000 | n3 | 1.62041 | v3 | 60.3 |
| r5 | 53.828 | d5 | variable | | | | |
| r6 | 43.600 | d6 | 0.700 | n4 | 1.80610 | v4 | 40.8 |
| r7 | 6.300 | d7 | 2.529 | | | | |
| r8 | −8.332 | d8 | 0.700 | n5 | 1.72916 | v5 | 54.7 |
| r9 | 6.609 | d9 | 2.400 | n6 | 1.80518 | v6 | 25.4 |
| r10 | −23125.990 | d10 | variable | | | | |
| r11 | diaphragm | d11 | 0.85 | | | | |
| r12 | 7.738 | d12 | 2.900 | n7 | 1.48749 | v7 | 70.2 |
| r13 | 24.598 | d13 | 0.511 | | | | |
| r14* | 15.888 | d14 | 1.500 | n8 | 1.49176 | v8 | 56.7 |
| r15* | 15.830 | d15 | variable | | | | |
| r16* | 30.888 | d16 | 1.500 | n9 | 1.49176 | v9 | 56.7 |
| r17* | 29.841 | d17 | 0.100 | | | | |
| r18 | 10.967 | d18 | 0.700 | n10 | 1.84666 | v10 | 23.8 |
| r19 | 5.498 | d19 | 3.100 | n11 | 1.69680 | v11 | 55.6 |
| r20 | −35.300 | d20 | variable | | | | |
| r21 | ∞ | d21 | 4.000 | n12 | 1.51633 | v12 | 64.2 |
| r22 | ∞ | | | | | | | variable spacing

| f | d5 | d10 | d15 | d20 |
|---|---|---|---|---|
| 3.76 | 0.698 | 20.833 | 8.803 | 4.000 |
| 28.2 | 16.462 | 5.118 | 3.297 | 9.506 |
| 73.9 | 20.567 | 1.014 | 10.003 | 2.800 | aspherical coefficients of surface 14

| | |
|---|---|
| K | −6.710 |
| A | −3.26041×10$^{-3}$ |
| B | −1.09851×10$^{-4}$ |
| C | 7.77231×10$^{-6}$ |
| D | −2.88541×10$^{-7}$ |
| E | 3.83953×10$^{-9}$ | aspherical coefficients of surface 15

| | |
|---|---|
| K | 5.287 |
| A | 2.88796×10$^{-3}$ |
| B | 3.23289×10$^{-4}$ |
| C | 2.08666×10$^{-7}$ |
| D | 2.89656×10$^{-7}$ |
| E | −6.82847×10$^{-9}$ | aspherical coefficients of surface 16

| | |
|---|---|
| K | −7.144 |
| A | 0.0 |
| B | 0.0 |
| C | 0.0 |

TABLE 1-continued

| | |
|---|---|
| D | 0.0 |
| E | 0.0 | aspherical coefficients of surface 17

| | |
|---|---|
| K | −4.300 |
| A | 8.96200× 10$^{-3}$ |
| B | 1.93390× 10$^{-6}$ |
| C | 2.16390× 10$^{-6}$ |
| D | 1.35340× 10$^{-8}$ |
| E | −7.60800×10$^{-10}$ |

In the present example, the refracting power of the plastic aspherical lens is defined by the following equations:

$$fw/|f3p| = 0.003$$

$$fw/|f4p| = 0.001$$

where fw is a focal length of an entire system at a wide-angle end, f3p is a focal length of the plastic aspherical lens L6 in the third lens group 3, and f4p is a focal length of the plastic aspherical lens L7 in the fourth lens group 4.

Figure 2:
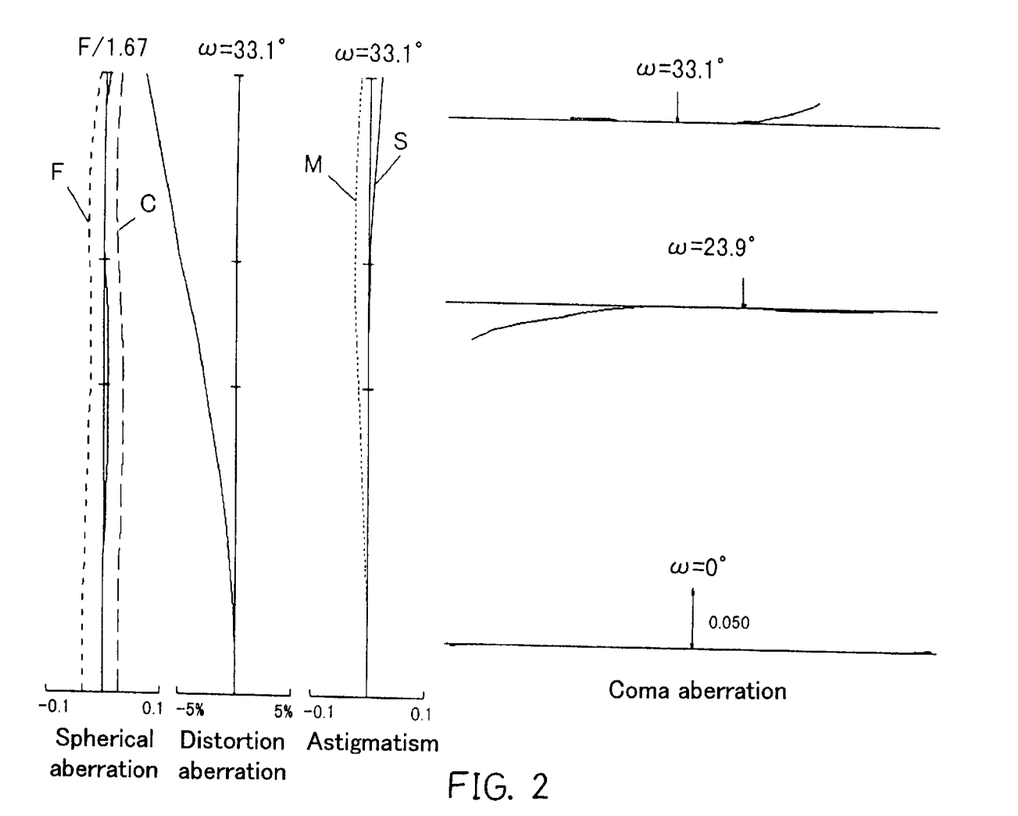
FIG. 2 illustrates aberration properties at a wide-angle end of the zoom lens in the first embodiment of the present invention.
Figure 3:
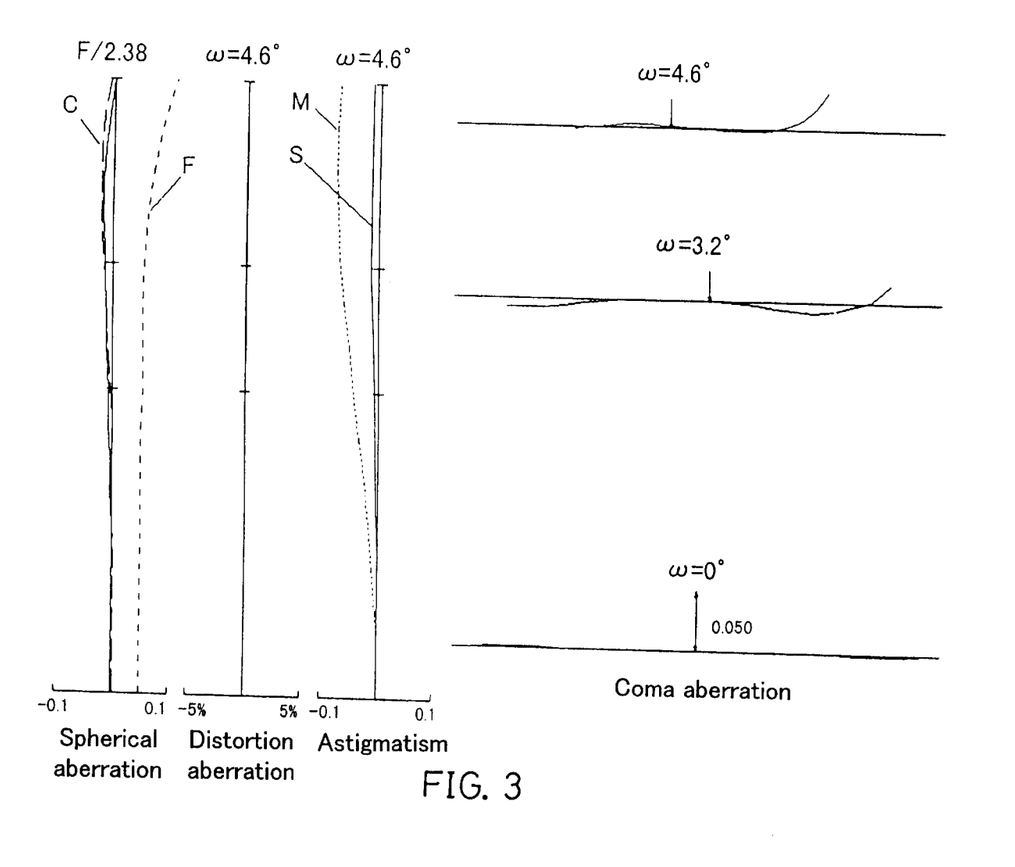
FIG. 3 illustrates aberration properties at an intermediate position of the zoom lens in the first embodiment of the present invention.
Figure 4:
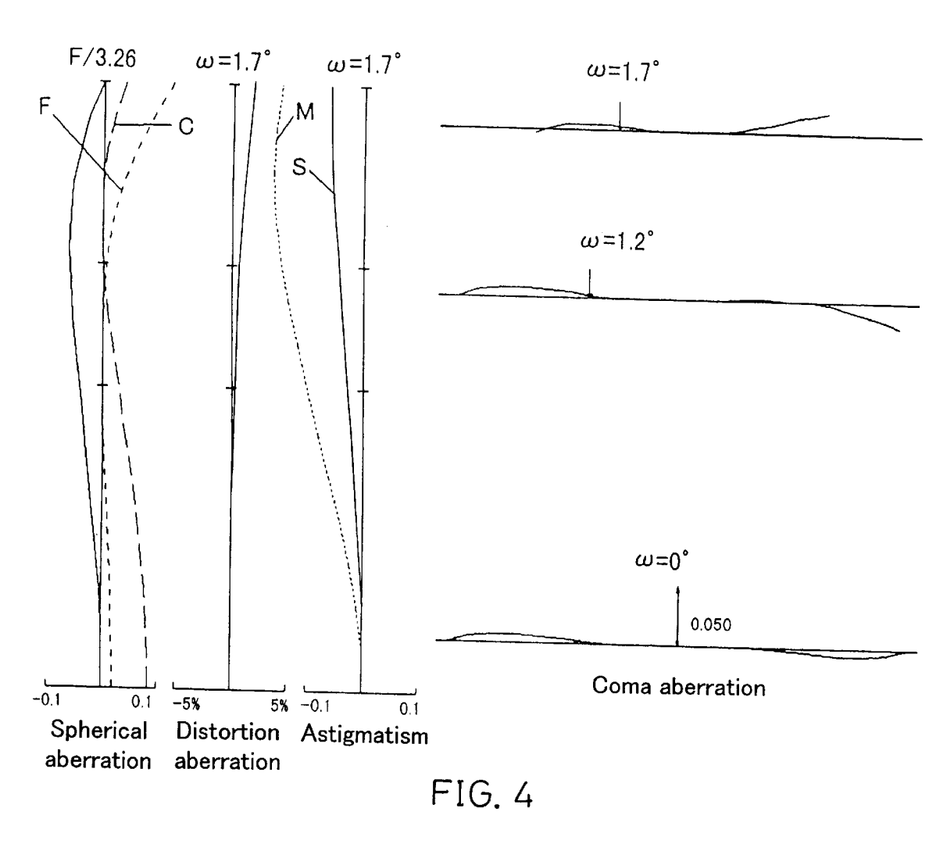
FIG. 4 illustrates aberration properties at a telephoto end of the zoom lens in the first embodiment of the present invention.

FIG. 2 to FIG. 4 illustrate aberrations at a wide-angle end, at an intermediate position and at a telephoto end of this zoom lens respectively. In FIG. 2 to FIG. 4, f shows a focal length of an entire system, F/shows an F number and 2ω shows an angle of view. In the spherical aberrations illustrated in FIG. 2 to FIG. 4, F shows a F-line, and C shows a C-line. Furthermore, in the illustrations of astigmatisms, S shows a sagittal image plane, and M shows a meridional image plane.

As is clear from these illustrations of aberrations, excellent optical performance with less aberration can be realized by combining a glass spherical lens and a plastic aspherical lens as in the present embodiment.

The zoom lens in the present embodiment can be realized at low cost, for example, by sharing the first and second lens groups and the lens barrels used in the conventional zoom lens composed of four groups of glasses as described above, and replacing the third and fourth lens groups with the configuration of the present embodiment, at least two kinds of zoom lenses can be manufactured while sharing the manufacturing facility. Moreover, depending on a change in the number of pixels in the image pickup device of a video camera, zoom lenses to be combined can be selected appropriately and manufactured more easily, so that a variety of merchandise lines can be realized with less capital investment.

Embodiment 2

Figure 5:
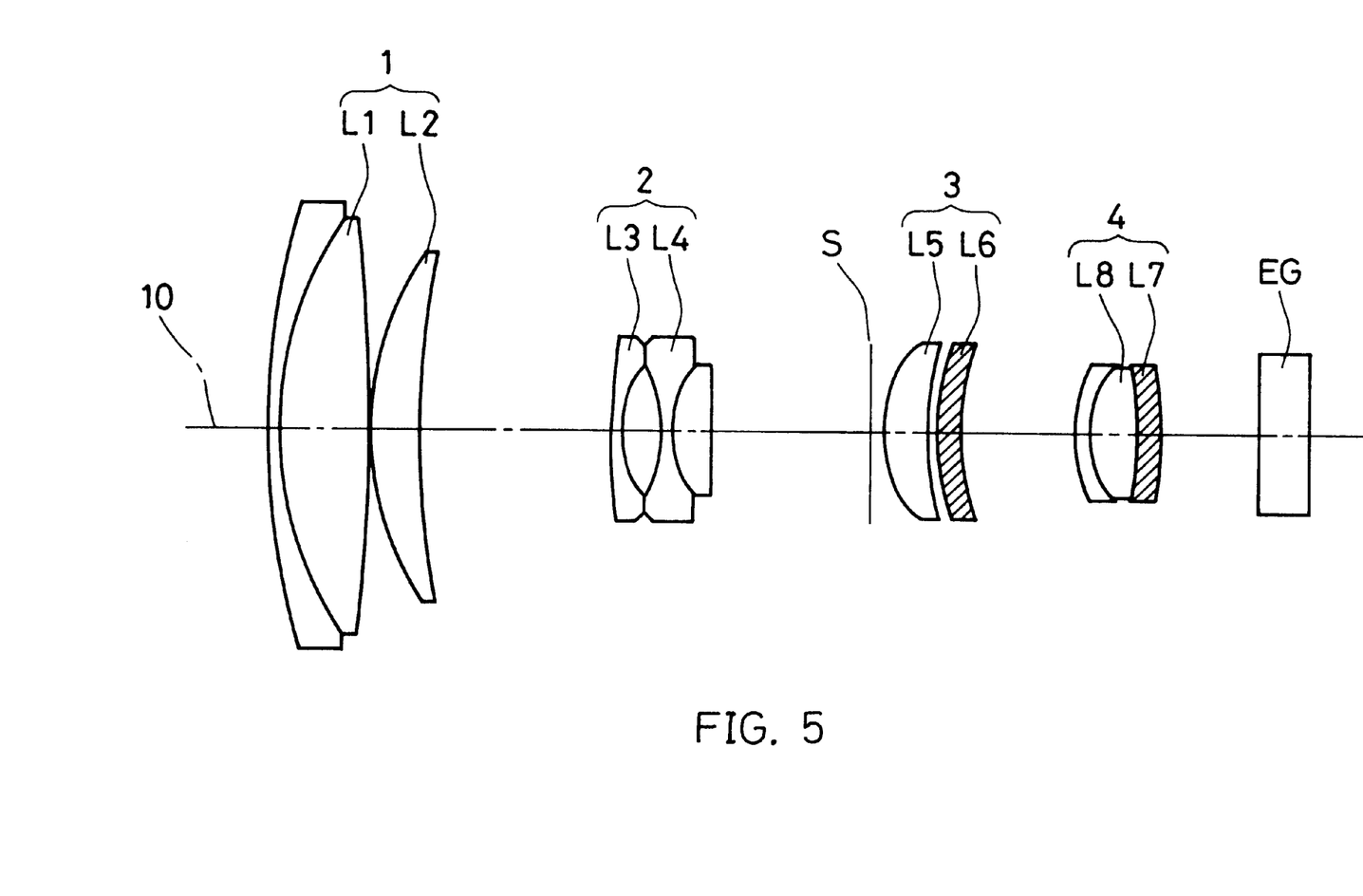
FIG. 5 is a view showing the configuration of a zoom lens in a second embodiment of the present invention.

FIG. 5 is a view showing the configuration of a zoom lens according to Embodiment 2 of the present invention. The zoom lens in the present embodiment differs from the zoom lens in Embodiment 1 in that the plastic aspherical lens L7 in the fourth lens group 4 is disposed on the side of an image plane of the glass spherical bonded lens L8. The configuration other than this aspect is the same as that in Embodiment 1, and the component members having the same functions as those in FIG. 1 have been given the same reference numerals, and the redundant explanations thereof are omitted.

The following Table 2 shows examples of values for the zoom lens in Embodiment 2. The various marks etc. in Table 2 have the same meaning as in Table 1.

| | f = 3.76 – 73.4 | | F/1.66 – F/3.24 | | |
|---|---|---|---|---|---|
| r1 | 45.883 | d1 | 1.000 | n1 | 1.84666 v1 23.8 |
| r2 | 23.833 | d2 | 5.450 | n2 | 1.60311 v2 60.6 |
| r3 | −135.640 | d3 | 0.150 | | |
| r4 | 20.326 | d4 | 3.000 | n3 | 1.62041 v3 60.3 |
| r5 | 53.370 | d5 | variable | | |
| r6 | 31.633 | d6 | 0.700 | n4 | 1.80610 v4 40.8 |
| r7 | 6.307 | d7 | 2.529 | | |
| r8 | −8.099 | d8 | 0.700 | n5 | 1.72916 v5 54.7 |
| r9 | 6.455 | d9 | 2.400 | n6 | 1.80518 v6 25.4 |
| r10 | 193.733 | d10 | variable | | |
| r11 | diaphragm | d11 | 0.85 | | |
| r12 | 8.287 | d12 | 2.900 | n7 | 1.48749 v7 70.2 |
| r13 | 34.473 | d13 | 0.548 | | |
| r14* | 17.477 | d14 | 1.500 | n8 | 1.49176 v8 56.7 |
| r15* | 17.412 | d15 | variable | | |
| r16 | 10.207 | d16 | 0.700 | n9 | 1.84666 v9 23.8 |
| r17 | 5.407 | d17 | 3.100 | n10 | 1.69680 v10 55.6 |
| r18 | −56.378 | d18 | 0.100 | | |
| r19* | −30.888 | d19 | 1.500 | n11 | 1.49176 v11 56.7 |
| r20* | −29.841 | d20 | variable | | |
| r21 | ∞ | d21 | 4.000 | n12 | 1.51633 v12 64.2 |
| r22 | ∞ | | | | | variable spacing

| f | d5 | d10 | d15 | d20 |
|---|---|---|---|---|
| 3.76 | 0.700 | 20.881 | 8.809 | 4.000 |
| 28.2 | 16.335 | 5.246 | 3.242 | 9.567 |
| 73.4 | 20.558 | 1.023 | 10.009 | 2.800 | aspherical coefficients of surface 14

| K | −7.366 |
|---|---|
| A | −4.36433×10$^{-3}$ |
| B | −9.69352×10$^{-5}$ |
| C | 4.60273×10$^{-6}$ |
| D | −1.55699×10$^{-7}$ |
| E | 2.08018×10$^{-9}$ | aspherical coefficients of surface 15

| K | 3.300 |
|---|---|
| A | 6.08972×10$^{-3}$ |
| B | −4.14075×10$^{-5}$ |
| C | 3.19769×10$^{-5}$ |
| D | −7.90882×10$^{-7}$ |
| E | 7.77467×10$^{-9}$ | aspherical coefficients of surface 19

| K | 5.019 |
|---|---|
| A | 0.0 |
| B | 0.0 |
| C | 0.0 |
| D | 0.0 |
| E | 0.0 | aspherical coefficients of surface 20

| K | −10.054 |
|---|---|
| A | 1.19933×10$^{-2}$ |
| B | 1.24795×10$^{-3}$ |
| C | −2.47896×10$^{-4}$ |
| D | 1.63710×10$^{-5}$ |
| E | −3.76317×10$^{-7}$ |

In the present example, the refracting power of the plastic aspherical lens is defined by the following equations:

$$fw/|f3p|=0.003$$

$$fw/|f4p|=0.001$$

Figure 6:
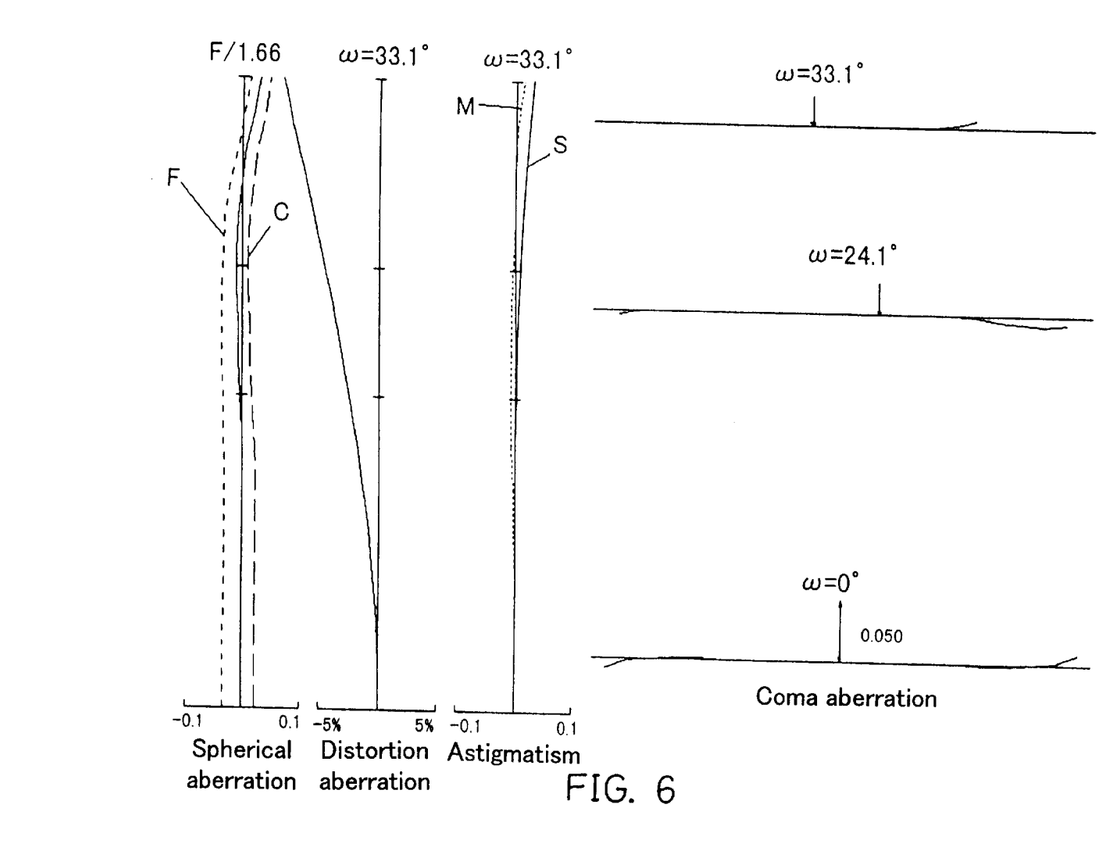
FIG. 6 illustrates aberration properties at a wide-angle end of the zoom lens in the second embodiment of the present invention.
Figure 7:
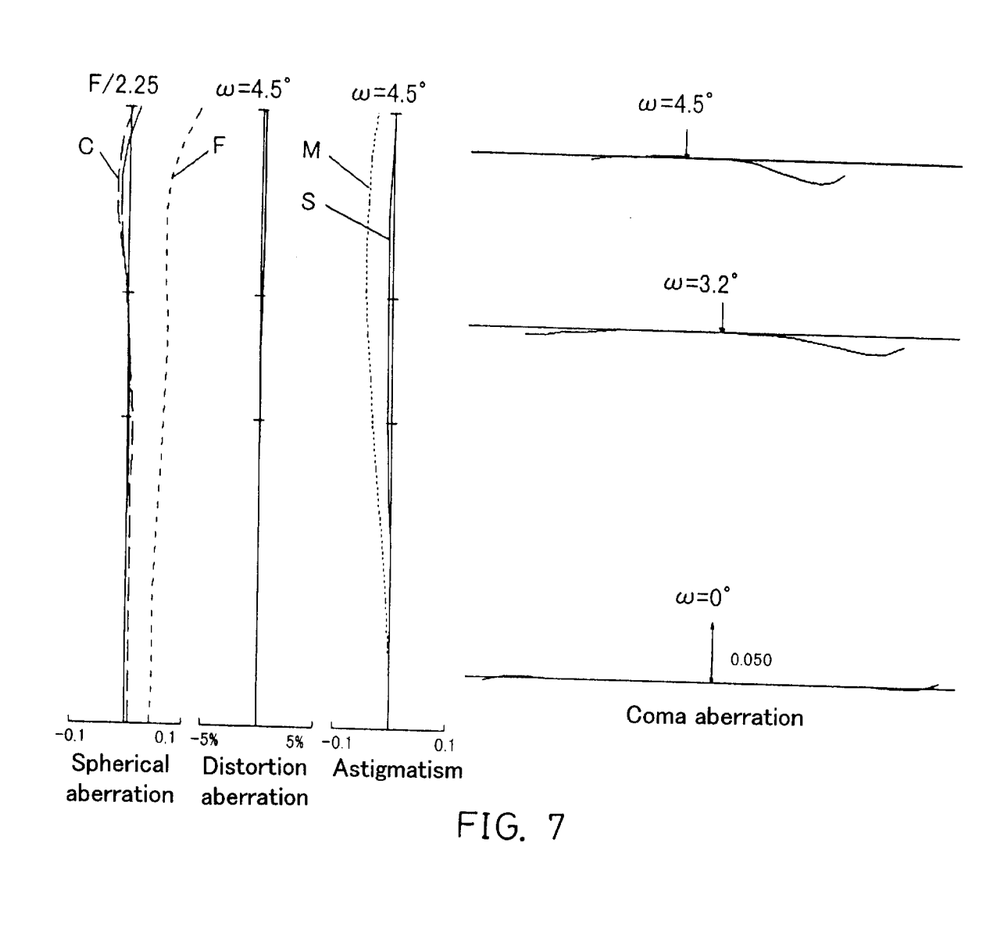
FIG. 7 illustrates aberration properties at an intermediate position of the zoom lens in the second embodiment of the present invention.
Figure 8:
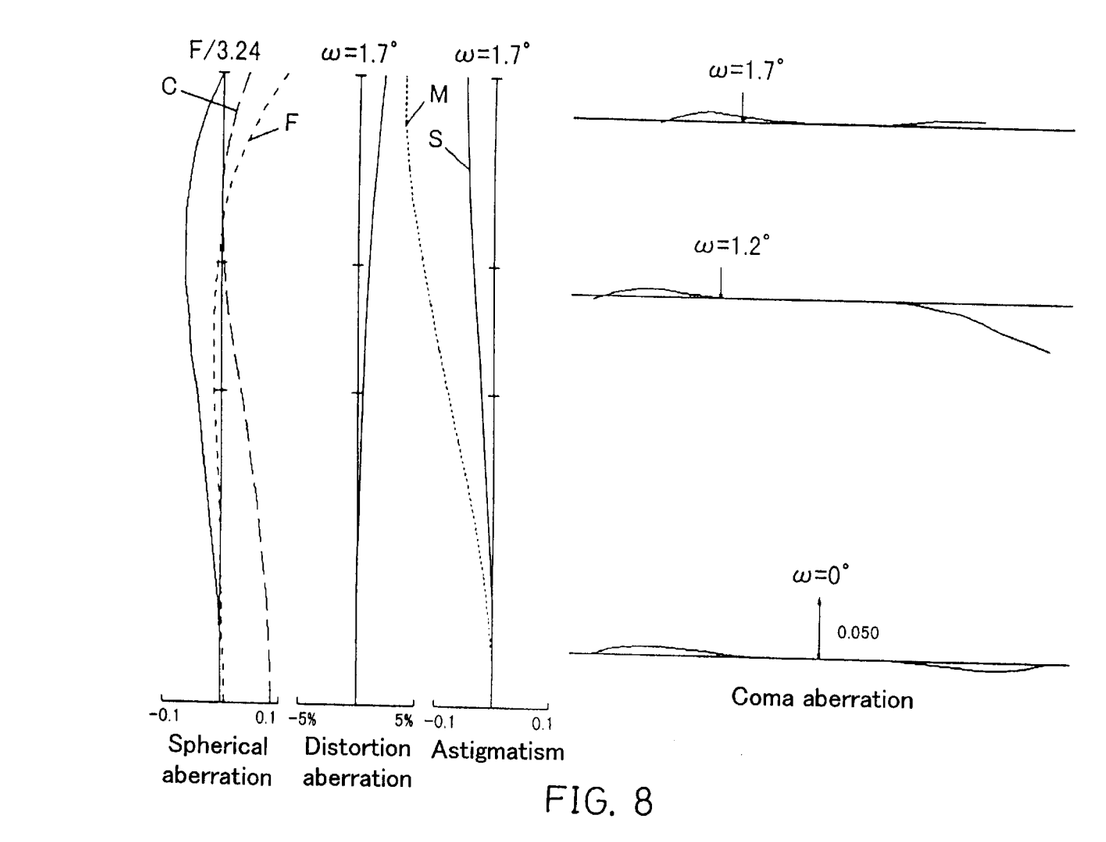
FIG. 8 illustrates aberration properties at a telephoto end of the zoom lens in the second embodiment of the present invention.

FIG. 6 to FIG. 8 illustrate aberrations at a wide-angle end, at an intermediate position and at a telephoto end of this zoom lens respectively. The marks etc. in the drawings are the same as those in FIG. 2 to FIG. 4.

The zoom lens in the present embodiment is able to achieve excellent optical performance with a low level of aberration similar to that of Embodiment 1.

Furthermore, as in Embodiment 1, for example, by sharing the common component members as those used in the conventional zoom lens composed of four groups of glasses, the manufacturing facility can be shared, so that the cost can be reduced, and a variety of merchandise lines can be realized.

The embodiments described above are all used strictly with the intention of clarifying the technical contents of the present invention, and the present invention is not to be considered as being limited to such specific examples. For example, the material used for the plastic lenses in the examples was polymethyl methacrylate (PMMA) (for example, "ACRYPET" manufactured by Mitsubishi Rayon Co., Ltd., "SUMIPEX" manufactured by Sumitomo Chemical Co., Ltd.), but other than this material, it is also possible to use a polycarbonate resin (PC) (for example, "PANLITE" manufactured by Teijin Chemicals Ltd., "IUPILON" manufactured by Mitsubishi Engineering-Plastics Corporation), a cyclic olefin polymer (for example, "ZEONEX" manufactured by Zeon Corporation, "ARTON" manufactured by JSR Corporation, "APEL" manufactured by Mitsui Chemicals, Inc.), a styrenic resin (for example, "ESTYLENE MS" manufactured by Nippon Steel Chemical Co., Ltd.), a polystyrene resin (PS) (for example, "DIC STYRENE" manufactured by Dainippon Ink and Chemicals Incorporated), a low-hygroscopic acrylic (for example, "OPTOREZ" manufactured by Hitachi Chemical Co., Ltd., "ACRYPET WF100" manufactured by Mitsubishi Rayon Co., Ltd.) or the like.

For example, when a polycarbonate resin (PC) is used, heat resistance and deformation due to moisture absorption can be improved compared to using polymethyl methacrylate (PMMA).

For example, when a cyclic olefin polymer is used, heat resistance and deformation due to moisture absorption can be improved considerably without deteriorating dispersion.

For example, when a styrenic resin or a polystyrene resin (PS) is used, the lens can be created inexpensively.

For example, when a low-hygroscopic acrylic is used, deformation due to moisture absorption can be improved.

Furthermore, when a polycarbonate resin is used, it is desirable to form the outer diameter of a lens to become sufficiently larger than the lens effective diameter in order to improve stress strain near the molding gate.

As a matter of course, the plastic lens in the third lens group and the plastic lens in the fourth lens group may be made of different resin materials or the same resin material.

Moreover, it was explained by referring to the examples of using glass spherical lenses for the first lens group and the second lens group, but aspherical lenses may be used for the first lens group and/or the second lens group. The use of aspherical lenses for the first lens group and/or the second lens group is effective for correcting distortion aberrations and so forth.

Thus, the present invention can be carried out in different variations without departing from the spirit and the claims of this invention, and the present invention is to be interpreted in a broad sense.

What is claimed is:

1. A zoom lens, comprising:
   a first lens group having a positive refracting force that is fixed;
   a second lens group having a negative refracting force that is movable along an optical axis and provided with a function of varying magnification;

a third lens group having a positive refracting force that is fixed; and a fourth lens group having a positive refracting force that is movable along an optical axis and provided with a function of correcting fluctuations of an image plane resulting from varying magnification or changing an object distance, the first, second, third and fourth lens groups being disposed from an object side in this order, wherein the third lens group and the fourth lens group both include a positive glass spherical lens and a plastic aspherical lens.

2. The zoom lens according to claim 1, wherein the plastic aspherical lens in the third lens group and the plastic aspherical lens in the fourth lens group satisfy the following conditional expressions:

$$fw/|f3p|<0.02$$

$$fw/|f4p|<0.02$$

where fw is a focal length of an entire system at a wide-angle end, f3p is a focal length of the plastic aspherical lens in the third group, and f4p is a focal length of the plastic aspherical lens in the fourth group.

3. The zoom lens according to claim 2, wherein the third lens group comprises a doublet composed of a positive glass spherical lens and a plastic aspherical lens disposed from an object side in this order.

4. The zoom lens according to claim 1, wherein the third lens group comprises a doublet composed of a positive glass spherical lens and a plastic aspherical lens disposed from an object side in this order.

5. A method for manufacturing a zoom lens comprising a third lens group and a fourth lens group respectively having a positive glass spherical lens and a plastic aspherical lens while using at least one or more lenses or lens barrels of a zoom lens that is constructed of a first lens group having a positive refracting force that is fixed, a second lens group having a negative refracting force that is movable along an optical axis and provided with a function of varying magnification, a third lens group having a positive refracting force that is fixed, and a fourth lens group having a positive refracting force that is movable along an optical axis and provided with a function of correcting fluctuations of an image plane resulting from varying magnification or changing an object distance, the first, second, third and fourth lens groups being disposed from an object side in this order.

6. The method for manufacturing a zoom lens according to claim 5, wherein the plastic aspherical lens in the third lens group and the plastic aspherical lens in the fourth lens group satisfy the following conditional expressions:

$$fw/|f3p|<0.02$$

$$fw/|f4p|<0.02$$

where fw is a focal length of an entire system at a wide-angle end, f3p is a focal length of the plastic aspherical lens in the third group, and f4p is a focal length of the plastic aspherical lens in the fourth group.

* * * * *